United States Patent [19]

Corcelle

[11] 4,383,161
[45] May 10, 1983

[54] THREADING AND CONVEYING DEVICE FOR AN ELECTRODE WIRE IN AN EDM APPARATUS

[75] Inventor: Francois Corcelle, Pouilly, France
[73] Assignee: Ateliers des Charmilles S.A., Geneva, Switzerland
[21] Appl. No.: 261,055
[22] Filed: May 6, 1981
[30] Foreign Application Priority Data
May 5, 1980 [CH] Switzerland ........................ 351380
[51] Int. Cl.³ .............................................. B23P 1/08
[52] U.S. Cl. ................................ 219/69 W; 218/69 R
[58] Field of Search ............... 219/69 R, 69 W, 69 M, 219/69 G, 68

[56] References Cited
U.S. PATENT DOCUMENTS
3,987,270 10/1976 Ullmann et al. .................. 219/69 W
4,242,559 12/1980 Roemer et al. .................... 219/69 W FOREIGN PATENT DOCUMENTS
2440564 3/1975 Fed. Rep. of Germany ... 219/69 W
55-54137 4/1980 Japan ................................ 219/69 W Primary Examiner—M. H. Paschall
Attorney, Agent, or Firm—Hauke and Patalidis

[57] ABSTRACT

A threading mechanism for threading the electrode wire of a travelling wire EDM apparatus, the end of the electrode wire being passed through a starter hole or aperture in the workpiece prior to effecting a cutting operation in the workpiece, wherein the entrance throat to the wire conveying mechanism adapted to take hold of the wire after passage through the starter aperture is offset laterally relative to the axis of the starter hole such as to laterally displace the wire to engage the wire with a guiding surface and a current feeding surface which are also offset relative to the axis of travel of the wire through the starter aperture.

5 Claims, 4 Drawing Figures

THREADING AND CONVEYING DEVICE FOR AN ELECTRODE WIRE IN AN EDM APPARATUS

BACKGROUND OF THE INVENTION

The present invention relates to a mechanism for threading an electrode wire through a starter hole or aperture in a workpiece prior to cutting the workpiece by electrical discharges.

Prior to starting a cut in a workpiece by way of the electrode wire of a travelling wire EDM apparatus, a starter hole or aperture is made in the workpiece, the electrode wire is threaded through the starter hole or aperture, and subsequently the wire is tensioned and displaced longitudinally through the machining zone between the wire and the workpiece. In the prior art electrode wire threading devices, the contact supplying electrical current to the wire and the wire guiding surface must be retracted to free the wire path until the end of the wire is taken up by the wire conveying mechanism, and they must be extended to their normal operating positions after engagement of the end of the wire in the conveying mechanism. Those functions can be achieved only by relatively complex mechanisms.

SUMMARY OF THE INVENTION

The present invention has for its principal object to eliminate the inconveniences and disadvantages of the prior art by eliminating all displacements of the contact member supplying current to the electrode wire and of the wire guide member.

For that purpose, the mechanism of the invention utilizes in addition to a conventional mechanism for threading the electrode wire through a starter hole or aperture in the workpiece and a wire conveying mechanism with an entrance throat for grasping the wire after passage through the starter hole or aperture and for longitudinally pulling the wire, novel means for engaging the wire with the surface of the guide member and with the contact for supplying electrical current to the wire, such novel means comprising offsetting the entrance throat of the wire conveying mechanism, the surface of the current feed contact and the surface of the wire guide member with respect to the axis of the starter hole or aperture, and means for laterally displacing the free end of the wire after threading through the starter aperture such as to guide the free end of the wire into the entrance throat of the conveying mechanism and simultaneously engage the wire with the electrical contact and guide surfaces.

As the free end of the wire is, for example, laterally displaced by one of the endless belts of the conveyor mechanism until engaged between that belt and the second conveyor belt, there is provided by the novel mechanism of the invention a simple, sturdy and economical device.

The diverse objects and advantages of the present invention will become apparent to those skilled in the art when the following description of examples of the best mode contemplated for practicing the invention is read in conjunction with the accompanying drawing, wherein like numerals refer to like or equivalent elements, and in which:

DETAILED DESCRIPTION OF THE PREFERRED EMBODIMENTS

Figure 1:
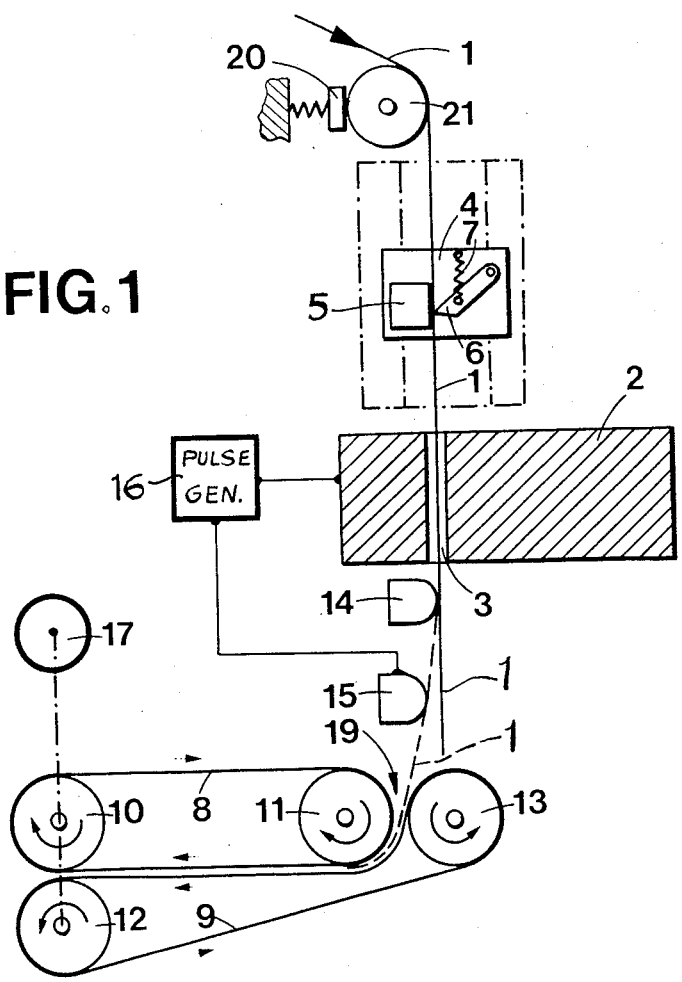
FIG. 1 schematically illustrates a travelling wire EDM apparatus provided with an example of wire threading mechanism according to the present invention.

FIG. 1 schematically illustrates the electrode wire 1 of an EDM apparatus during threading through a starter hole or aperture 3 pre-formed in the workpiece 2. Longitudinal feed of the wire 1 during the threading operation is effected by a linearly movable carriage 4 which pulls the wire by way of a self-locking pincher mechanism comprising a bearing surface 5 and an angled lever 6 pressing the wire 1 against the bearing surface 5 under the biasing action of a spring 7. The driving motor for the carriage 4 is not shown in the drawing, because it does not form part of the present invention.

A wire driving mechanism is provided by a conveyor comprising two endless belts 8 and 9, the belt 8 being supported by a pair of spaced apart rollers 10 and 11 and the belt 9 being supported by a pair of spaced apart rollers 12 and 13. The belts 8 and 9 and the rollers 11 and 13 are mutually disposed such as to form an entrance throat 19 for the wire 1 between the rollers 11 and 13. The belts 8 and 9 engage each other such as to sandwich the wire 1 and frictionally convey the wire by entrainment between the two belts and to discharge the wire through an outlet between the rollers 10 and 12.

The structure illustrated further comprises a guide member 14, providing a guiding surface for the wire 1, disposed below the workpiece 2, and a contact finger or slider 15 for supplying machining current to the wire 1. The machining pulses for triggering machining electrical discharges are obtained from a pulse generator 16 having a terminal connected to the workpiece 2 and another terminal connected to the contact finger 15.

The conveyor belts 8 and 9, and the rollers supporting the belts, are driven by an electric motor 17 whose output shaft is coupled to the rollers 10 and 12 such as to drive the rollers 10 and 12 in opposite directions of rotation, as shown by the arrows.

A progressively increasing offset relative to the axis of the starter hole or aperture 3 is provided for the surface of the guide member 14, the surface of the finger contact 15 and the entrance throat 19 of the wire conveying mechanism between the rollers 11 and 13. In this manner, after the end of the wire 1 has been engaged between the belts 8 and 9 and is pulled by the belts, the wire being tensioned by being braked above the machining zone by a pulley 21 held back by a brake pad or shoe 20, the peripheral surface of the wire is caused to engage first the surface of the guide member 14 and subsequently the surface of the electrical contact finger 15, the wire, each time, changing slightly its direction of travel. Consequently, thanks to the novel structure of the invention, displacement of the wire guide and wire contact elements in the course of an electrode wire threading operation in an EDM apparatus are no longer necessary.

Figure 2:
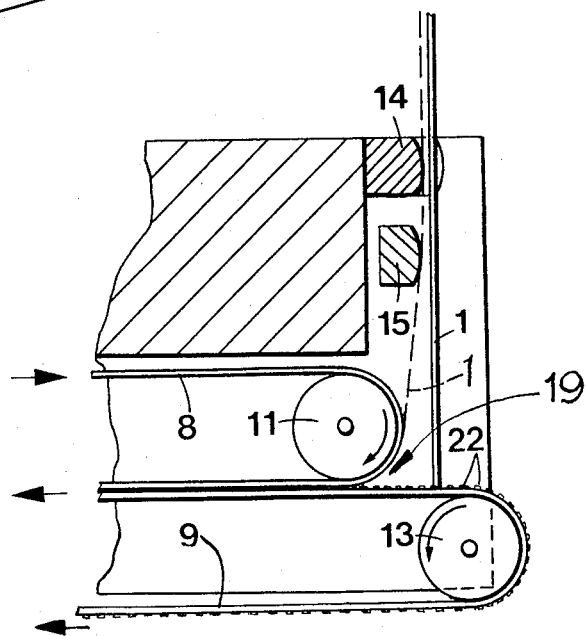
FIG. 2 is a partial view illustrating a modification of the mechanism of FIG. 1.

The endless belt 9 can be provided with transverse corrugations or cogs defining transverse grooves therebetween as shown at 22 at FIG. 2. In the arrangement of FIG. 2, the belt support roller 13 is disposed relative to the roller 11 such as to present a portion of the surface of the belt 9 to the path of the electrode wire 1 to enable the end of the wire to become engaged between two adjacent corrugations or cogs in a groove 22, which in turn causes lateral displacement of the end of the wire 1 from the position shown in full line to the position shown in dashed line until the end of the wire is engaged between the two belts 8 and 9 of the conveyor mechanism.

Figure 3:
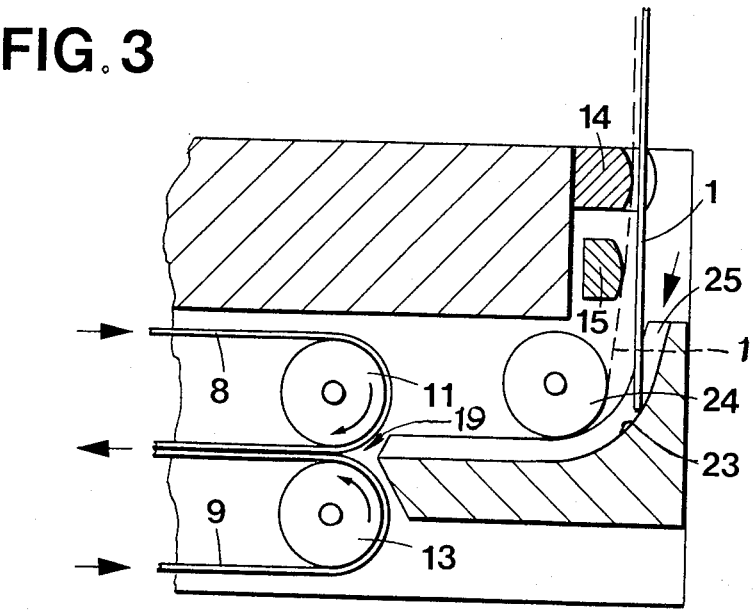
FIGS. 3 and 4 are partial views illustrating each a further modification of the mechanism of the invention.

FIG. 3 illustrates another arrangement for transversely displacing the end of the wire 1. In the structure of FIG. 3, the end of the wire 1 is deflected by an arcuate surface 23 and becomes engaged between the arcuate surface 23 and the peripheral surface of a roller 24 such as to be deflected in an appropriate direction introducing the end of the wire into the entrance throat 19 between the rollers 11 and 13 supporting the conveyor belts 8 and 9. The introduction of the wire end between the arcuate surface 23 and the peripheral surface of the roller 24 can be facilitated by injecting a fluid at the upper end 25 of the guiding arcuate surface 23 in the direction of the arrow.

Figure 4:
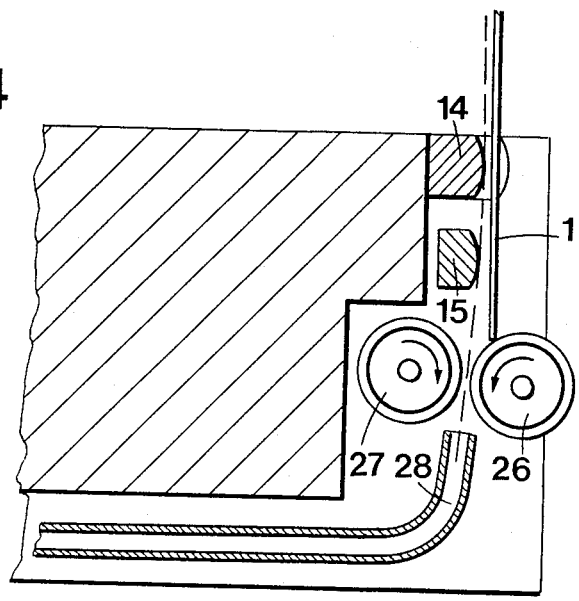

The wire 1 can also be deflected transversely by means of the structure illustrated at FIG. 4, wherein the transverse displacement of the end of the wire 1 is effected by a rotating roller 26 until the end of the wire is introduced between the periphery of the roller 26 and the periphery of a co-operating roller 27 rotating in an opposite direction. The end of the wire 1 is subsequently introduced into the inlet of a bent tubing 28, as shown in dashed line, for ultimate disposal to the exterior of the EDM apparatus.

It will be appreciated that the principle of transverse displacement of an electrode wire can be used with other mechanisms for driving the wire during the wire threading operation.

Having thus described the present invention by way of examples of structural embodiments well designed to accomplish the purpose of the invention, what is claimed as novel is as follows:

1. In an EDM apparatus, a mechanism for threading an electrode wire through a workpiece, said mechanism comprising means for pushing said wire through a starter aperture in said workpiece, wire conveying means taking hold of the end of said wire after threading through said starter aperture and for pulling said wire through said starter aperture, a stationary guiding surface for engagement with said wire after passage through said starter aperture and a stationary electric current supplying contact surface for engagement with said wire after passage through said starter aperture, said guiding surface and said contact surface being laterally offset relative to the axis of the starter aperture, and means for laterally displacing the end of said wire after threading through said starter aperture for engaging the end of said wire into said conveying means while simultaneously laterally displacing said wire for engaging said wire with said offset guiding and contact surfaces.

2. The mechanism of claim 1 wherein said conveying means comprises a conveyor provided with two opposed belts in mutual engagement for sandwiching said wire therebetween, wherein one of said belts is disposed in the path of said wire for displacing the end of said wire toward the other belt.

3. The mechanism of claim 2 wherein said one of said belts has transverse grooves on its surface.

4. The mechanism of claim 1 further comprising an arcuate guiding surface for engagement by the end of said wire for laterally deflecting said wire.

5. The mechanism of claim 1 comprising a pair of oppositely rotating rollers defining an entrance throat for said conveyor means, one of said rollers being located in the path of said wire for deflecting the end of said wire to bring it into said entrance throat.

* * * * *